(No Model.)
J. KENNEDY.
CHECK ROW ATTACHMENT FOR CORN PLANTERS.
No. 362,515. Patented May 10, 1887.
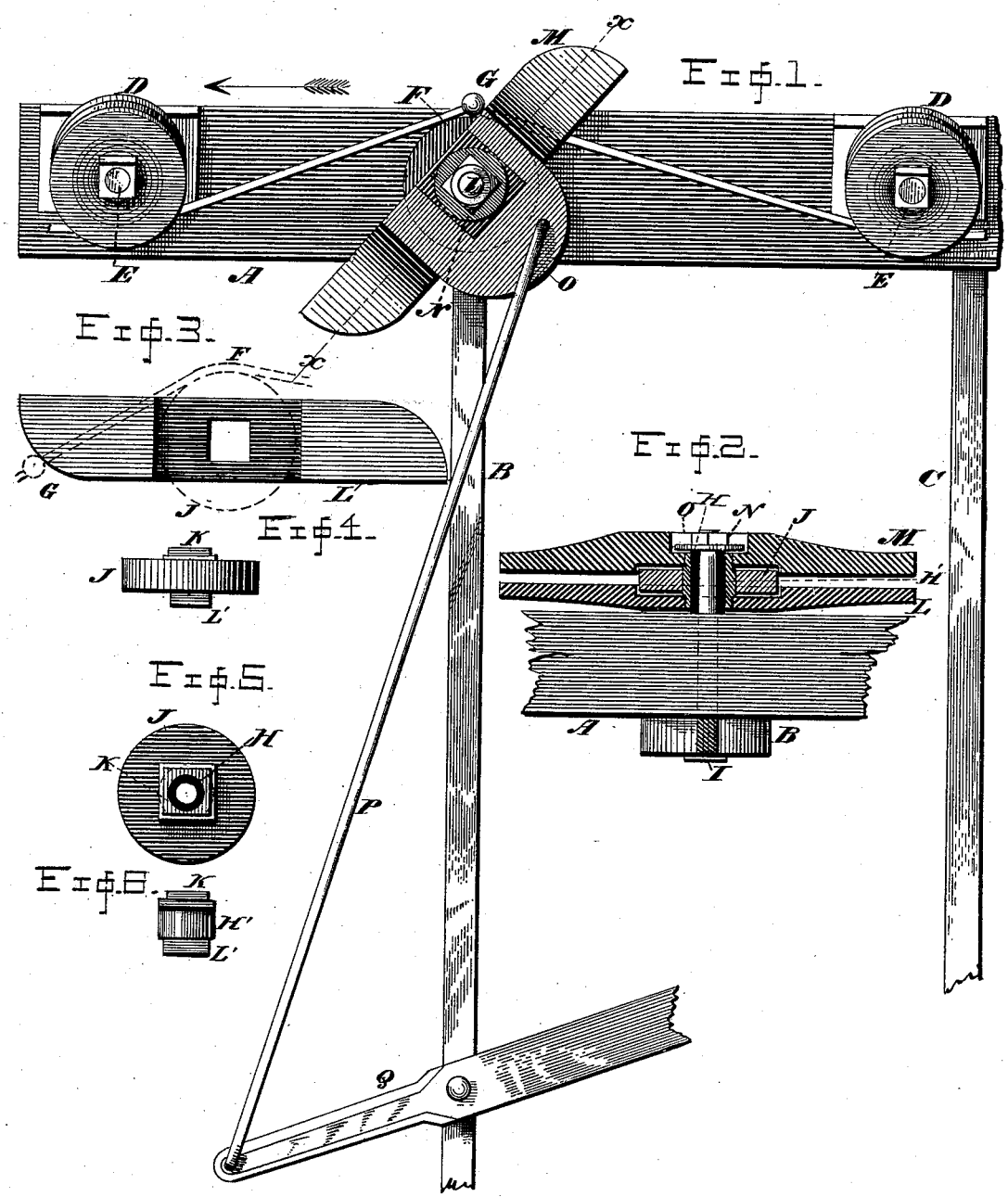
WITNESSES
INVENTOR
James Kennedy
By Toulmin & Jenner,
his Attorneys.

UNITED STATES PATENT OFFICE.

JAMES KENNEDY, OF FRANKLIN, KENTUCKY.

CHECK-ROW ATTACHMENT FOR CORN-PLANTERS.

SPECIFICATION forming part of Letters Patent No. 362,515, dated May 10, 1887.

Application filed October 16, 1886. Serial No. 216,435. (No model.)

*To all whom it may concern:*

Be it known that I, JAMES KENNEDY, a citizen of the United States, residing at Franklin, in the county of Simpson and State of Kentucky, have invented a certain new and useful Improvement in Check-Row Attachments for Corn-Planters, of which the following is a specification, reference being had therein to the accompanying drawings.

This invention is an improvement in check-rowers; and it relates to an attachment which receives motion by contact with the check-row wire, and which, through intermediate devices, actuates the slide of the seed-box.

The attachment consists, essentially, of the jaws mounted to rotate, and an independently-rotating disk located between the said jaws, the peculiarities of which will hereinafter more fully appear.

In the accompanying drawings, forming a part of this specification, and on which like reference-letters indicate corresponding features, Figure 1 represents a plan view of a portion of a corn or a seed planter, showing my attachment and the usual guide-pulleys applied thereto; Fig. 2, a sectional view on the line *x x* of the attachment, showing a fragment of the frame; Fig. 3, a plan view of the upper side of the lower jaw; Figs. 4, 5, and 6, detached views of the disk and the sleeve upon which it rotates.

The letter A designates a portion of one of the side beams of the ordinary or any approved planter-frame, and the letters B and C two of the cross-beams thereof. Upon the beam A are rotatingly mounted the grooved guiding pulleys or rollers D upon an arbor, E, and in oblique position, for the purpose of more certainly preventing the accidental displacement of the check-row wire or rope F from the grooves. This wire is provided at proper intervals with enlargements or balls G. A bolt, I, is passed through the beam A, and used, by preference, to connect the beam B therewith, and upon the bolt is fitted a bushing, H, and a sleeve, H', the ends of which latter are square or angular and the intermediate portion round. Upon the round portion of the sleeve a disk, J, is fitted to rotate, while at K and L' the sleeve is shouldered and jaws L and M fitted upon the respective angular portions. A nut and washer, N, are applied to the bolt I and the jaw M prevented from slipping off the sleeve H'. Within the sleeve H', and immediately around the bolt, as already suggested, is a bushing, H, which is slightly longer than the sleeve, and bears upon the beam A and receives the direct pressure of the washer. Thus it will be observed that the disk J and the jaws L and M may rotate together, and also independently of each other. The object in allowing the disk to rotate independently of the jaws is to permit it to turn when the enlargements G on the check-row wire reach it, as seen in Fig. 1, for if it did not rotate independently the enlargements would rub and drag across the disk from the point where they first touched it until they reach the jaws. This is objectionable, and hence the provision for the independent rotation of the disk is made.

The jaw M is provided with a boss or projection, O, to which is connected a pitman, P, at one end, and at the other the pitman connects with the pivoted lever Q, which latter in turn connects with the slide of a seed-box. The ends of the jaws are oppositely curved, as seen in Figs. 1 and 3, so as to permit the enlargement on the wire to readily engage with the jaws, although the center of the jaws be but slightly beyond or to one side of the enlargement as they come in contact, as illustrated by the dotted lines in Fig. 3.

The operation of the attachment will be understood from the following: The check-row wire is secured at the sides of the field, as usual, and the wire is slipped between the jaws and against the outer side of the disk and into the grooves of the guide-rollers at the inner side. The machine is then driven in the direction of the arrow, and the enlargement on the wire, being stationary, resists the passage of the jaws, and causes them to rotate out of the path of the enlargement. As one enlargement is being left behind, another is just beginning to engage with the opposite sides of the opposite ends of the jaws, whereby the continued rotary motion of the jaws is maintained and the feeding-slide kept in motion.

Having thus fully described my invention, what I claim as new, and desire to secure by Letters Patent, is—

1. The combination, with a planter, its guiding-pulleys, and a fixed wire or rope having enlargements, of the jaws having oppositely-curved ends and rotatingly mounted upon the planter, the independently-rotating disk, the pitman connected to one of the jaws, and the lever connected to the pitman and adapted to actuate the feed-slide.

2. The combination, with a planter and an arbor or bolt, of a bushing fitted to said arbor, a shouldered sleeve fitted to the bushing, a disk rotatingly mounted upon the sleeve, and jaws secured upon the sleeve.

3. The combination, with an arbor, a bolt, and a bushing thereon, of a shorter sleeve fitted upon the bushing and having a round portion, angular portions, and shoulders, a disk fitted to rotate upon said round portions, and jaws having oppositely-curved ends and openings fitted to the angular portions of the sleeve.

4. The combination, with an arbor or bolt, of a disk and two jaws to rotate thereon, and the jaws provided with oppositely-curved ends.

In testimony whereof I affix my signature in presence of two witnesses.

JAMES KENNEDY.

Witnesses:
JAMES C. HARDY,
JAMES W. DISHMAN.